May 18, 1943. E. S. HEBELER 2,319,401
METHOD OF AND APPARATUS FOR WELDING METAL
Filed Jan. 3, 1941
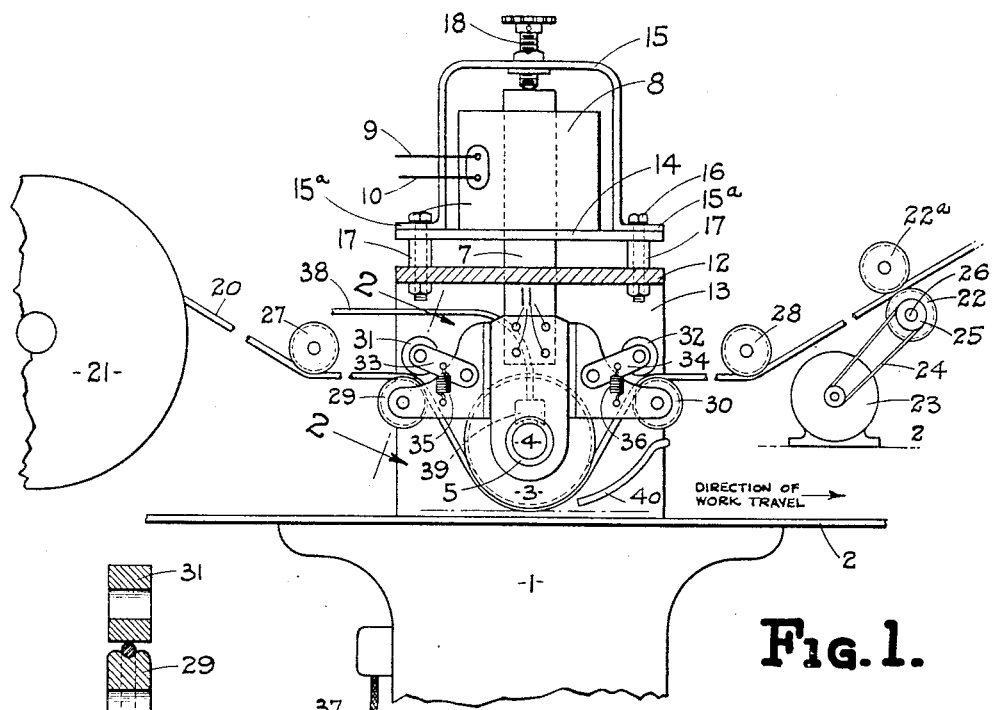
Fig. 1.
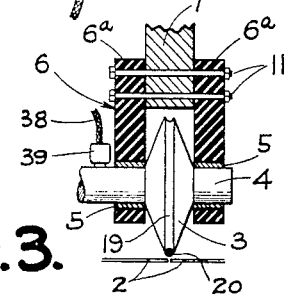
Fig. 2.
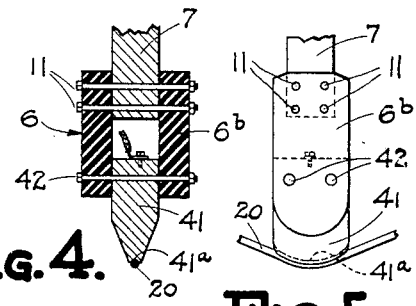
Fig. 3. Fig. 4. Fig. 5.
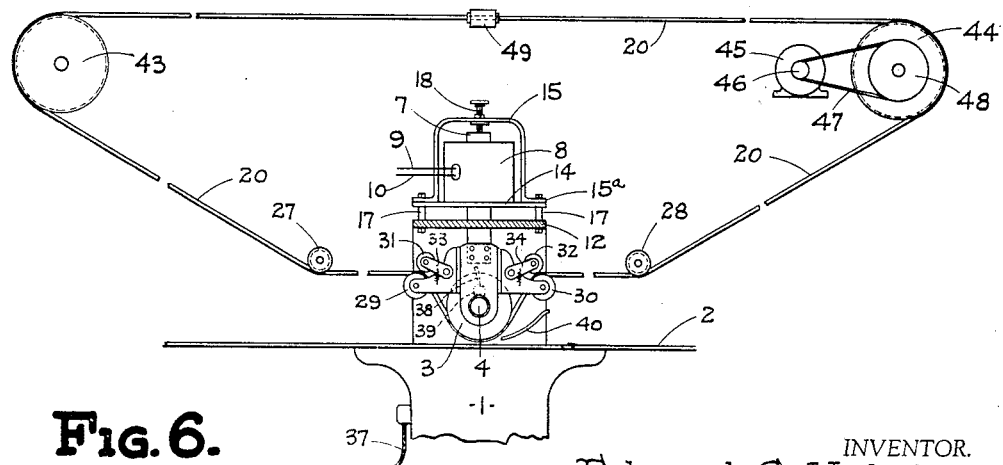
Fig. 6.
INVENTOR.
Edward S. Hebeler
BY Hull, West & Chilton
ATTORNEYS.

Patented May 18, 1943

2,319,401

UNITED STATES PATENT OFFICE 2,319,401

METHOD OF AND APPARATUS FOR WELDING METAL

Edward S. Hebeler, Williamsville, N. Y., assignor, by mesne assignments, to Unit Rays, Inc., Cleveland Ohio, a corporation of Ohio Application January 3, 1941, Serial No. 372,981

6 Claims. (Cl. 219—8)

This invention relates to a method of and apparatus for welding metal electrically wherein a welding arc is established between a non-melting electrode and the metal constituting the work and wherein the welding is effected by fusion of the adjacent edges of the work metal.

In the operation of apparatus of this character with which I am familiar, difficulty has been encountered in maintaining the uniformity in the width of the air gap between the electrode and the work which is necessary to enable continuous welding of considerable lengths of metal to be obtained.

Where current-conducting material, such as copper, has been used for the electrode, vaporous particles of work metal from within the arc have been deposited upon and have adhered to the portion or portions of the electrode in the welding zone thereby shortening the length of the air gap or arc between the work and the particles thus deposited as compared with the length of the air gap or arc between the work and the body of the electrode in the welding zone. These variations in the length of the air gap or arc have resulted in corresponding changes in the character of the weld produced, making it impracticable to obtain continuous welding over a comparatively long interval of time.

It is the general object of my invention to overcome these variations in the length of the air gap or arc in apparatus employing a non-melting electrode, whereby it will be possible to obtain continuous welding on a commercial scale. I realize this object by presenting to the arc successive portions of an element constituting an electrode, throughout an entire long-continued welding operation, whereby the portion of the electrode element which is subjected to the arc is being moved continuously away from the arc before any material deposition of vaporous metal thereon may occur.

Further and more limited objects of the invention will be set forth hereinafter and will be realized in and through the construction and arrangement of parts shown in the drawing hereof, wherein Fig. 1 represents a somewhat diagrammatic elevation of the operating portions of a welding apparatus having my invention embodied therein; Fig. 2 a detail in section corresponding to the line 2—2 of Fig. 1 and looking in the direction of the arrows; Fig. 3 a central vertical sectional view through the lower portion of the apparatus shown in Fig. 1; Fig. 4 a view similar to Fig. 3, showing a modified form of electrode and Fig. 5 a side elevation of the electrode shown in Fig. 4; and Fig. 6 a view, similar to Fig. 1, showing a further modification of my invention.

Describing the parts by reference characters and referring more particularly to Figs. 1, 2 and 3, 1 denotes a work support and 2 the work to be welded, the work illustrated diagrammatically herein consisting of two strips of metal having their edges in close proximity, with means (not shown) for drawing the strips along the work support. 3 denotes a rotary guide for the electrode proper, the said guide being in the form of a roller of conducting material, such as copper, mounted upon an axle 4 supported by bushings 5 within a frame 6 comprising opposed side members 6a of insulating material. 7 denotes a core mounted for reciprocatory movement within the solenoid coil 8, provided with the conductors 9 and 10. The lower end of this core is secured to the tops of the side frame member 6a by bolts 11. The core 7 extends through a top plate 12 of a framework having sides 13 supported by the work table 1. The coil 8 is supported upon a base plate 14 and is provided with a bell-shaped cover 15 having a flange 15a at the bottom by means of which and bolts 16 the cover and the bottom plate 14 are supported from the plate 12, being spaced from said plate by bushings 17.

The length of the air gap or arc between the electrode which extends beneath the bottom of the roller 3 and the work is controlled by a set screw 18 which extends through the top of the cover 15, with its lower end in engagement with the top of the core 7. It will be noted that the roller 3 is in the general shape of two flat cones placed base to base and having at their junction a channel 19 extending therearound. This channel is provided for the reception and guidance of a wire 20, which is wound upon a supply drum 21 and which, as the welding operation proceeds, is drawn from said supply drum at a predetermined speed by gripping feed rollers 22, 22a, the former being driven at a suitable speed from the shaft of a motor 23 by a belt 24 extending around said shaft and the pulley 25 on the axis 26 of which the roller 22 is mounted. Any other suitable reduction drive may be employed between the motor and the roller 22.

The wire 20 is preferably led beneath guide pulleys 27 and 28 located on opposite sides of the frame 6. The bottoms of these guide pulleys or idlers are in substantially the same horizontal plane as the tops of the guide pulleys 29 and 30 which are secured to opposite sides of the frame 6 and on opposite sides of the roller 3. These pulleys, as will be seen by reference to Fig. 2, are grooved and the wire is held within the grooves by means of rollers 31 and 32 pivotally supported between arms 33, 34 mounted upon the side members 6a of the frame 6, the rollers being held in gripping engagement with the wire by means of springs 35, 36.

Electrical current for welding purposes is supplied from a suitable source (not shown) to the metallic work bed by a conductor 37 and to the axle of the hub of the roller 3 by means of a conductor 38 and brush 39. In the construction thus far described, the roller 3 is of current conducting material, and current is supplied to the said roller and to the electrode wire 20 through the roller, which is mounted in the frame 6 on the axle 4. If desired, however, welding current may be supplied to the electrode wire 20 by means of brushes engaging the same adjacent to the said frame 6.

With the parts constructed and arranged as described, the operation will be readily understood. While no current is passing through the conductors 37 and 38, the electrode wire will be in contact with the adjacent edges of the metal work strip. When current is supplied to the said conductors, the circuit is completed through the electrode wire 20 which is at that time in contact with the work. At the same time, current is also supplied through another circuit to the coil 8, whereby the core 7 will be drawn upwardly into the coil, moving the roller 3 and the electrode wire therebeneath away from the work through a distance determined by the set screw 18, whereby the welding arc will be struck or formed across the resulting air gap. The welding arc having been established, relative movement between the work and the electrode is obtained, preferably by moving the work beneath and past the electrode, and at the same time the electrode wire is drawn from the drum 21 at a predetermined speed by the gripping feed rollers, so that new and clean portions of the electrode wire will be continuously passing through the welding zone, thereby maintaining substantially constant the length of the air gap or arc.

With this construction, I prefer to employ a jet of air supplied through the pipe 40, said jet being preferably directed between the work and the portion of the electrode which has just passed through the arc, whereby the arc is prevented from following this portion of the electrode and the peripheral portion of the guide roller on which it is mounted.

In Figs. 4 and 5, I have shown a modification of the electrode guide shown in the preceding views, wherein the said guide is non-rotatable. In this view, 6b denotes the sides of the frame 6, being in all respects identical with the sides 6a shown in the preceding views. The electrode guide in this case consists of a metal block 41 which is secured between the lower ends of the sides of the frame by bolts 42. The lower end of the block 41 presents a convex surface toward the work, being of arcuate shape, and is provided with a groove 41a for the guidance of the electrode wire 20.

In the construction shown in the views thus far discussed, it is contemplated that a sufficient quantity of electrode wire will be mounted upon and reeled from the drum 21 to correspond to the amount of welding to be done in that particular operation. In Fig. 6, however, I have shown a modification of the invention illustrated in the preceding views, wherein means are provided for cleaning the wire during the welding operation, whereby successive portions of the same wire may be used repeatedly in a single long-continued welding operation as well as in different welding operations. In this view, the parts are identical with those shown in Fig. 1, with the exception that, in place of the drum 21 and gripping feed rollers, I employ pulleys 43 and 44, the latter pulley being a drive pulley driven from the shaft 46 of a motor 45 by means of a belt 47 and a smaller pulley 48. These pulleys will preferably be mounted as far apart as permitted by the environment in which the welding apparatus is used. Interposed between the said pulleys is a trimming device 49, through which the wire is drawn and which will remove from the wire any particles of metal that may have been deposited thereupon from the vapors in the arc, thus making it possible to perform a multiplicity of welding operations with the use of a comparatively short length of electrode wire. If desired, a similar trimming device may be arranged to operate upon the wire after the same shall have passed through the zone of the arc in the apparatus shown in the preceding views.

In all of the forms of my invention shown herein, by the employment and location of the pulleys 27, 28, 29 and 30, the electrode wire may be drawn through the arc without exercising a lifting effort upon the electrode guide 3 and the frame 6, which lifting effort might be detrimental to the normal operation of the solenoid coil upon the core 7 and the electrode guides 3 and 41. Also, in all forms of my invention, by the use of the rollers 31, any tendency of the electrode wire to be displaced from the grooves in the roller 3 and block 41, due to the quick lifting of the frame 6 by the solenoid will be overcome.

In place of using the solenoid coil and core as a means for lifting the electrode guide from the work after the welding circuit has been preliminarily closed, I may, by changing the angular relation of the electrode wire to the guide, effect this lifting by the pull upon the electrode wire, employing with the guide and its mount a stop corresponding to and having the function of the set screw 18.

Having thus described my invention, what I claim is:

1. In the electric arc welding of metals by the use of a non-melting electrode, the method which includes the step of continuously propelling successive portions of a wire electrode through the welding zone at a predetermined speed, maintaining the portions passing through the said zone at a predetermined distance from the work, and directing a jet of gaseous fluid under pressure between the work and the successive portions of the wire electrode leaving the arc and in a direction opposite to the direction of travel of the said electrode.

2. In an apparatus for the electric arc welding of metals, the combination of a support for the work to be welded, a guide having a convex portion opposed to and in proximity to the work on said support, a pair of pulleys, an elongated continuous loop of wire having one of the stretches thereof extending around the said guide and in proximity to the work, an idler pulley and a driving pulley supporting the said loop for drawing the wire across the convex portion of the said support, a trimming device arranged to remove from the wire any matter which may have been deposited thereon from the vapors in the arc, means for moving the guide to and maintaining the same at a predetermined distance from the work, means for forming an electric arc between the work and the portions of the wire which are brought successively into proximity thereto, and means for directing a gaseous jet under pressure into the arc and between the work and the portions of the wire which have successively passed through the arc and in a direction opposed to the direction of movement of the said wire.

3. In an apparatus for the electric arc welding of metals by means of a non-melting electrode, the combination of a support for the work to be welded, a source of wire supply, means for drawing wire continuously from said source, means for maintaining successive portions of the wire thus drawn from said source at a predetermined arc-forming distance from the work, and means for forming and maintaining an electric arc between the work and the successive portions of the wire which are drawn from the said source and which are maintained at such predetermined arc-forming distance from the work.

4. In an apparatus for the electric arc welding of metals by means of a non-melting electrode, the combination of a support for the work to be welded, a second support having a portion presented toward the work on the first support, a source of wire supply, means for drawing wire continuously from said source across the said portion of said second support, means for spacing the second support, and thereby the successive portions of the wire interposed between the same and the work, at a predetermined distance from said work, and means for forming and maintaining an electric arc between successive portions of the work and the successive portions of the wire which are spaced at such predetermined distance from the work by said second support.

5. In the apparatus set forth in claim 3, means for directing a jet of gaseous fluid under pressure between the work and the successive portions of the wire leaving the arc and in a direction opposite to the direction of travel of the said wire.

6. In the apparatus set forth in claim 4, means for directing a jet of gaseous fluid under pressure between the work and the successive portions of the wire leaving the arc and in a direction opposite to the direction of travel of the said wire.

EDWARD S. HEBELER.